US010135066B2

(12) United States Patent
Kang et al.

(10) Patent No.: US 10,135,066 B2
(45) Date of Patent: Nov. 20, 2018

(54) POSITIVE ELECTRODE ACTIVE MATERIAL FOR LITHIUM SECONDARY BATTERY, METHOD OF PREPARING THE SAME AND LITHIUM SECONDARY BATTERY INCLUDING THE SAME

(71) Applicant: LG Chem, Ltd., Seoul (KR)

(72) Inventors: Min Suk Kang, Daejeon (KR); Chi Ho Jo, Daejeon (KR); Ji Hoon Ryu, Daejeon (KR); Sun Sik Shin, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/513,461

(22) PCT Filed: Oct. 2, 2015

(86) PCT No.: PCT/KR2015/010456
§ 371 (c)(1),
(2) Date: Mar. 22, 2017

(87) PCT Pub. No.: WO2016/053056
PCT Pub. Date: Apr. 7, 2016

(65) Prior Publication Data
US 2017/0317342 A1     Nov. 2, 2017

(30) Foreign Application Priority Data

Oct. 2, 2014   (KR) ................. 10-2014-0133466
Oct. 2, 2014   (KR) ................. 10-2014-0133473
Oct. 1, 2015   (KR) ................. 10-2015-0138718

(51) Int. Cl.
*H01M 4/36*     (2006.01)
*H01M 4/505*    (2010.01)
(Continued)

(52) U.S. Cl.
CPC .......... *H01M 4/366* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2002/0076613 A1   6/2002   Lee et al.
2004/0200998 A1   10/2004  Park et al.
(Continued)

FOREIGN PATENT DOCUMENTS

CN    1565063 A   1/2005
CN    1577925 A   2/2005
(Continued)

OTHER PUBLICATIONS

JP 2003217586 Machine Translation. Tabuchi et al. Japan Jul. 2003. (Year: 2003).*
(Continued)

*Primary Examiner* — Jonathan G Leong
*Assistant Examiner* — Christopher P Domone
(74) *Attorney, Agent, or Firm* — Lerner, David, Littenberg, Krumholz & Mentlik, LLP (57) ABSTRACT

A positive electrode active material of the present invention includes lithium cobalt oxide particles; and a surface treatment layer positioned on a surface of the lithium cobalt oxide particle, and the lithium cobalt oxide particle includes lithium deficient lithium cobalt oxide having a Li/Co molar ratio of less than 1, included in an Fd-3m space group, and having a cubic-type crystal structure, in a surface side of the particle. The surface treatment layer includes at least one element selected from the group consisting of transition metals and elements in group 13.

28 Claims, 3 Drawing Sheets

(51) Int. Cl.
*H01M 4/525* (2010.01)
*H01M 4/58* (2010.01)
*H01M 10/0525* (2010.01)
*H01M 4/02* (2006.01)
*H01M 4/62* (2006.01)
*H01M 10/052* (2010.01)

(52) U.S. Cl.
CPC ........... *H01M 4/5825* (2013.01); *H01M 4/62* (2013.01); *H01M 10/0525* (2013.01); *H01M 10/052* (2013.01); *H01M 2004/028* (2013.01); *H01M 2220/20* (2013.01); *Y02E 60/122* (2013.01)

(56) References Cited

U.S. PATENT DOCUMENTS

| | | | |
|---|---|---|---|
| 2004/0265693 | A1 | 12/2004 | Kurachi |
| 2006/0063070 | A1 | 3/2006 | Chiga et al. |
| 2012/0009476 | A1* | 1/2012 | Park ............... H01M 4/131 429/223 |
| 2013/0224594 | A1* | 8/2013 | Yushin ............ H01M 4/38 429/218.1 |
| 2014/0045067 | A1 | 2/2014 | Cho et al. |
| 2014/0212745 | A1 | 7/2014 | Kim et al. |
| 2014/0212759 | A1 | 7/2014 | Blangero et al. |
| 2016/0268601 | A1* | 9/2016 | Paulsen ............ H01M 4/485 |
| 2016/0329563 | A1* | 11/2016 | Oh .................. H01M 4/505 |

FOREIGN PATENT DOCUMENTS

| | | |
|---|---|---|
| CN | 103022467 A | 4/2013 |
| CN | 103236521 A | 8/2013 |
| CN | 103620833 A | 3/2014 |
| CN | 103635431 A | 3/2014 |
| EP | 1237212 A2 | 9/2002 |
| JP | 2000164214 A | 6/2000 |
| JP | 2003217586 A | 7/2003 |
| KR | 20030083476 A | 10/2003 |
| KR | 20120004340 A | 1/2012 |
| KR | 20140067508 A | 6/2014 |
| KR | 20140095810 A | 8/2014 |

OTHER PUBLICATIONS

Chinese Search Report for Application No. 201580054006.X dated Nov. 2, 2017.
International Search Report From PCT/KR2015/010456 dated Jan. 14, 2016.
Gummow, R.J. et al., "Spinel versus layered structures for lithium cobalt oxide synthesised at 400° C." Materials Research Bulletin, 1993, vol. 28, No. 3, pp. 235-246.
Choi, S. et al. "Chemical synthesis and properties of spinel Li1-xCo2O4-d", Journel of Solid State Chemistry, 2002, vol. 164, No. 2, pp. 332-228.
Van Der Ven, A. et al., "Electrochemical properties of spinel LixCoO2: A first-principles investigation", Physical Review B, 1999, vol. 59, No. 2, pp. 742-749.
Cho J. et al: "Enhancement of Thermal Stability of LICOO2 by LIMN2O4 Coating", Electrochemical and Solid-State Letters, vol. 2, No. 6, Mar. 16, 1999 (Mar. 16, 1999), pp. 253-255.
Extended European Search Repor for Application No. 15845891.9 dated Jul. 3, 2017, 10 pages.
Written Opinion of the International Searching Authority for PCT/KR2015/010456, dated Jan. 14, 2016.
Chinese Search Report for Application No. CN201580054006.X dated May 11, 2018.

\* cited by examiner

POSITIVE ELECTRODE ACTIVE MATERIAL FOR LITHIUM SECONDARY BATTERY, METHOD OF PREPARING THE SAME AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2015/010456, filed Oct. 2, 2015, which claims priority to Korean Patent Application Nos. 10-2014-0133466 and 10-2014-0133473, filed on Oct. 2, 2014, and Korean Patent Application No. 10-2015-0138718, filed on Oct. 1, 2015, the disclosures of which are incorporated herein by reference.

TECHNICAL FIELD

The present invention relates to a positive electrode active material for a lithium secondary battery, a method of preparing the same, and a lithium secondary battery including the same.

BACKGROUND ART

As technical developments and demands on mobile devices are increasing, demands on secondary batteries as an energy source is being rapidly increasing. Among the secondary batteries, lithium secondary batteries having high energy density and voltage, long cycle life, and low discharge rate are commercialized and widely used.

However, the lithium secondary battery has a limitation that the life thereof decreases rapidly via repeating charge and discharge. Particularly, the limitation is more serious at high temperatures. The reason is that an electrolyte may be decomposed due to water in the battery or other factors, an active material may be deteriorated, or the internal resistance of the battery may increase.

A positive electrode active material for a lithium secondary battery, which is being actively researched, developed and used, is $LiCoO_2$ with a layered structure. $LiCoO_2$ may be easily synthesized and has good electrochemical properties including life property, and is the most widely used material. However $LiCoO_2$ has low structural stability, and the application thereof to a battery with high capacity is limited.

As the substituents of the positive electrode active material, various lithium transition metal oxides such as $LiNiO_2$, $LiMnO_2$, $LiMn_2O_4$, $LiFePO_4$, and $Li(Ni_xCo_yMn_z)O_2$ have been developed. $LiNiO_2$ has merits of providing the battery properties of high charge capacity, however is hardly synthesized by a simple solid phase reaction and has low thermal stability and cycle property. In addition, lithium manganese oxides such as $LiMnO_2$ and $LiMn_2O_4$ have merits of good thermal stability and low cost, however have limitations of a small capacity and inferior properties at high temperatures. Particularly, for $LiMn_2O_4$, some products are commercialized at low cost, however the life property thereof is not good due to Jahn-Teller distortion owing to $Mn^{3+}$. Since $LiFePO_4$ is inexpensive and safe, a lot of research is being conducted for the use in a hybrid electric vehicle (HEV), however the application thereof to another fields is hard due to low conductivity.

Due to such circumstances, a lithium nickel manganese cobalt oxide, $Li(Ni_xCo_yMn_z)O_2$ (where x, y, and z are atomic partial ratios of independent oxide composite elements and satisfy $0<x\leq1$, $0<y\leq1$, $0<z\leq1$, and $0<x+y+z\leq1$), receives much attention as the substituting positive electrode active material of $LiCoO_2$. This material is cheaper than $LiCoO_2$ and has merits of being used under a high capacity and a high voltage. However, the material has demerits of not providing good rate characteristic and life property at high temperatures. In order to increase the structural stability of the lithium nickel manganese cobalt oxide, the amount of Li relative to the amount of a transition metal included in the oxide is increased.

Recently, as the size of portable devices such as mobile phones and tablet computers is gradually miniaturized, batteries applied thereto are also required to be miniaturized together with high capacity and high energy. In order to increase the energy of a battery per unit volume, the packing density of an active material is required to be increased. In order to increase the packing density and a voltage, active materials having a large size are preferable. However, the active materials having a large size have a relatively small surface area, and thus, an active area making contact with an electrolyte may be also narrow. The narrow active area may be kinetically unfavorable, and relatively low rate characteristic and initial capacity may be attained.

DISCLOSURE OF THE INVENTION

Technical Problem

According to an aspect of the present invention, there is provided a positive electrode active material for a lithium secondary battery, in which a side reaction with an electrolyte may be restrained, and which may have high packing density, and so, exhibit high capacity property and improved rate characteristic and initial capacity property, and so, have good lithium conductivity and improved output property and life property.

According to another aspect of the present invention, there is provided a positive electrode, a lithium secondary battery, a battery module, and a battery pack including the positive electrode active material.

Technical Solution

According to an aspect of the present invention, there is provided a positive electrode active material for a lithium secondary battery including lithium cobalt oxide particles; and a surface treatment layer positioned on a surface of the lithium cobalt oxide particle, in which the lithium cobalt oxide particle includes lithium deficient lithium cobalt oxide having a Li/Co molar ratio of less than 1, being included in an Fd-3m space group, and having a cubic-type crystal structure, in a surface side of the particle, and the surface treatment layer includes at least one element selected from the group consisting of transition metals and elements in group 13.

According to another aspect of the present invention, there is provided a method of preparing the positive electrode active material for a lithium secondary battery including preparing second lithium cobalt oxide particles by mixing a cobalt raw material and a lithium raw material in amounts satisfying the relation of $1 \leq Li/Co$ molar ratio, and first heating; preparing lithium cobalt oxide particles including lithium deficient first lithium cobalt oxide in a surface side of the particle by mixing a cobalt raw material and a lithium raw material in amounts satisfying the relation of $0<Li/Co$ molar ratio$<1$ with respect to the second lithium cobalt oxide particles, and second heating; and forming a surface treatment layer including a lithium compound including at least one element selected from the group consisting of transition metals and elements in group 13, or a mixture thereof, on a surface of the lithium cobalt oxide particle, in which the lithium deficient first lithium cobalt oxide has a Li/Co molar ratio of less than 1, is included in an Fd-3m space group, and has a cubic-type crystal structure.

According to a further another aspect of the present invention, there are provided a positive electrode including the positive electrode active material, and a lithium secondary battery including the positive electrode.

According to a further another aspect of the present invention, there is provided a battery module including the lithium secondary battery as a unit cell.

According to a further another aspect of the present invention, there is provided a battery pack including the battery module.

Particulars of exemplary embodiments of the present invention will be included in the following detailed explanation.

Effects of the Invention

According to the positive electrode active material for a lithium secondary battery according to the present invention, a side reaction with an electrolyte may be restrained, and high packing density and capacity property, and improved rate characteristic and initial capacity property may be obtained. In addition, good lithium conductivity, and improved output property and life property may be attained.

BRIEF DESCRIPTION OF THE DRAWINGS

The accompanying drawings in the present disclosure illustrate preferred embodiments of the present invention, and serve to further understanding of the principles of the present invention together with the description. The present invention should not be construed as limited to the description in the drawings.

BEST MODE FOR CARRYING OUT THE INVENTION

Hereinafter, the present invention will be explained in more detail to assist the understanding of the present invention.

It will be further understood that terms or words used in the description and claims should not be interpreted as having a meaning such as those used in common or defined in dictionaries, however should be interpreted as having a meaning and concept that is consistent with the technical spirit of the present invention on the basis of a principle that an inventor may define the concept of terms appropriately to explain his invention by the best way.

According to the present invention, a lithium deficient structure is formed, by which the three-dimensional transport of lithium ions may be possible in the exterior of the lithium cobalt oxide particles, that is, in the surface side thereof, and a surface treatment layer including a lithium compound including at least one element selected from the group consisting of transition metals and elements in group 13 is formed on the surface of the lithium cobalt oxide particle. Accordingly, a side reaction with an electrolyte may be restrained, high packing density and high capacity property may be attained, improved rate characteristic and initial capacity property may be obtained, good lithium ion conductivity may be attained, and good output property and life property may be obtained.

That is, the positive electrode active material for a lithium secondary battery according to an embodiment of the present invention includes lithium cobalt oxide particles; and a surface treatment layer positioned on a surface of the lithium cobalt oxide particle.

The lithium cobalt oxide particle includes lithium deficient lithium cobalt oxide having a Li/Co molar ratio of less than 1, included in an Fd-3m space group, and having a cubic-type crystal structure, in a surface side of the particle.

The surface treatment layer includes a lithium compound including at least one element selected from the group consisting of transition metals and elements in group 13.

Particularly, in the positive electrode active material according to an embodiment of the present invention, the lithium cobalt oxide particles include lithium deficient lithium cobalt oxide that has a Li/Co molar ratio of less than 1, and more particularly, from 0.95 to less than 1 in the surface sides of the particles.

Different from common lithium cobalt oxide having a layered crystal structure, the lithium deficient lithium cobalt oxide may have a cubic-type crystal structure included in an Fd-3m space group, and the lattice constant (a0) thereof may be from 7.992 to 7.994 (25° C.). The crystal structure is similar to a spinel-type crystal structure, and lithium ions may transport in a three-dimensional direction like in the spinel-type crystal structure. Accordingly, the transport of the lithium ions may be easy, and the rate may be high when compared to those in a layered structure in which the lithium ions may transport in a two-dimensional direction, and so, the intercalation and deintercalation of the lithium ions may become easier. In the present invention, the lithium deficient lithium cobalt oxide that has the above-described crystal structure is provided in the surface side of the lithium cobalt oxide particles, and the transport of the lithium ions may be easy, and rate characteristic may be improved when applied to a battery. In addition, due to the decrease of resistance at the surface side of the active material, output property may be improved.

The crystal structure of the lithium deficient lithium cobalt oxide may be identified by a common identification method of a crystal structure, and the crystal structure may particularly be identified using a transmission electron microscope.

More particularly, the lithium deficient lithium cobalt oxide may include first lithium cobalt oxide of the following Formula 1.

$$Li_{1-a}CoM_xO_2 \qquad \text{[Formula 1]}$$

(In Formula 1, "a" and "x" are atomic fractions of each independent component of the oxide and satisfy the following relations of $0<a\leq0.05$, and $0\leq x\leq0.02$.)

In Formula 1, M includes at least one metal element selected from the group consisting of W, Mo, Zr, Ti, Mg, Ta, Al, Fe, V, Cr, Ba, Ca, and Nb as a doping element, and may be included in the first lithium cobalt oxide in an amount such that "x" satisfies the relation of 0≤x≤0.02. As described above, in the case where the metal element is further doped into the lithium deficient lithium cobalt oxide, structural stability may be improved, and there would be no more concern on the deterioration of the structural stability of the positive electrode active material due to lithium deficiency. In addition, the output property of a battery may be improved, and by doping the above-described amount, the improving effect thereof may be further improved.

More particularly, in the positive electrode active material for a lithium secondary battery according to an embodiment of the present invention, the lithium cobalt oxide particles may have a core-shell structure. In this case, a shell part may include lithium deficient first lithium cobalt oxide of the following Formula 1, and a core part may include second lithium cobalt oxide of the following Formula 2.

[Formula 1]

[Formula 2]

(In Formulae 1 and 2, M and M' each independently includes at least one metal element selected from the group consisting of W, Mo, Zr, Ti, Mg, Ta, Al, Fe, V, Cr, Ba, Ca, and Nb, and "a", "b", "x", and "y" are the atomic fractions of the independent components of the oxide and satisfy the following relations of 0<a≤0.05, 1≤b≤1.2, 0≤x≤0.02, and 0≤y≤0.02.)

In Formula 1, the two relations of 0<a≤0.05, and 1≤b≤1.2 are satisfied at the same time, the improving effect of rate characteristic according to the formation of a lithium deficient structure may be further improved by 10% or more when compared to an active material with "a" greater than 0.05 and with "b" greater than 1.2. In addition, the improving effect of the rate characteristic may be the improved to the maximum of 30% when compared to lithium cobalt oxide ($LiCoO_2$) without forming a lithium deficient structure.

In the lithium cobalt oxide particles, the lithium cobalt oxide may have the spinel-like structure as described above, that is, may be included in an Fd-3m space group, have a cubic-type crystal structure, and the second lithium cobalt oxide may have a layered structure.

As described above, concerning the transport of the lithium ions, the positive electrode active material according to an embodiment of the present invention includes lithium cobalt oxide having a deficient structure allowing the three-dimensional transport of lithium ions in the surface side of the active material particles, that is, in a shell part, and the transport of lithium may become easy, the initial internal resistance of a lithium secondary battery may decrease, and the rate characteristic may be improved. In addition, by including lithium rich lithium cobalt oxide having a Li/Co ratio of 1 or more in the core part, the structural stability of the active material, particularly, the structural stability thereof at high temperatures may be improved, and the deterioration of capacity at high temperatures may be prevented. Such effects may be more effective for a positive electrode active material with large-sized particles.

In consideration of the control of the Li/Co ratio according to the position in the active material particle and the remarkable improving effect therefrom, the two relations of 0.01<a≤0.05, and 1≤b≤1.05 may be satisfied in Formulae 1 and 2.

More particularly, in the positive electrode active material having the core-shell structure, the core part and the shell part may include lithium distributed with a gradually increasing concentration gradient toward the center of the lithium cobalt oxide particle in each region.

In this case, the lithium concentration gradient in the core part and the shell part may each independently change according to the thickness of the particle from the center of the active material particle and may form a linear equation or a quadric equation. In addition, the lithium concentration gradient in the core part and the lithium concentration gradient in the shell part may have the same or different gradient values.

Meanwhile, in the positive electrode active material having the core-shell structure, each of the core part and the shell part may include the lithium present with one concentration value in each region. In this case, the lithium concentration in the core part may be higher than the lithium concentration in the shell part.

In addition, in the case where the core part and the shell part each independently has different lithium concentration distribution, height difference according to the difference of the lithium concentration in the core part and the shell part may be formed at the contacting interface of the core part and the shell part.

Meanwhile, the positive electrode active material having the core-shell structure may include lithium distributed with a gradually increasing concentration gradient from the surface to the center of the particle over the whole active material particles. In this case, "a" may decrease toward the center of the particle within a range of 0<a≤0.05, and "b" may increase toward the center of the particle within a range of 1≤b≤1.2. In addition, the lithium concentration gradient may each independently change according to the thickness of the particle from the center of the active material particle and may form a linear equation or a quadric equation. With the concentration gradient over the whole particles, a rapid phase boundary region is not present from the center to the surface, thereby stabilizing a crystal structure and increasing thermal stability. In addition, if the concentration gradient of a metal is constant, the improving effect of structural stability may be increased further.

In the present invention, the concentration change of the lithium in the surface and the inner part of the particle may be measured by a common method, and the concentration of the lithium and other elements present in the surface may be measure by an X-ray photoelectron spectroscopy (XPS), a transmission electron microscopy (TEM), or an energy dispersive x-ray spectroscopy (EDS). The lithium component in the lithium cobalt oxide may be measured using an inductively coupled plasma-atomic emission spectrometer (ICP-AES), and the shape of the lithium cobalt oxide may be identified using a time of flight secondary ion mass spectrometry (ToF-SIMS).

In the present invention, the "surface side" of the lithium cobalt oxide particle means an adjacent region to the surface excluding the center of the particle, and particularly means a region corresponding to a distance from the surface to the center of the lithium cobalt oxide particle, that is, a distance from 0% to less than 100% from the surface of the particle relative to the radius of the lithium cobalt oxide. In addition, the shell part of the lithium cobalt oxide particle is a region corresponding to a distance from the surface to the center of the lithium cobalt oxide particle, that is, from 0% to 99%, and more particularly, from 0% to 95% from the surface of the particle relative to the radius of the particle. Accordingly, the core part is present in the inner part of the shell part and means a region excluding the shell part from the lithium cobalt oxide particle.

Particularly, in the lithium cobalt oxide particle, the radius of the core part and the thickness of the shell part may have a ratio from 1:0.01 to 1:0.1. In the case where the radius of the core part deviates the upper limit and is excessively large, the increasing effect of the mobility of lithium ions according to the formation of the shell part including the lithium deficient lithium cobalt oxide and the resultant improving effect of battery properties may be trivial, and in the case where the thickness of the shell part deviates the upper limit and is excessively large, the core part may be relatively decreased, and the structural stabilizing effect in the active material particle may be trivial. More particularly, under the conditions of the ratio of the radius of the core part and the thickness of the shell part, the thickness of the shell part may be from 1 to 500 nm, or from 10 to 450 nm.

In the positive electrode active material for a lithium secondary battery according to an embodiment of the present invention, the second lithium cobalt oxide with the lithium deficient structure may be included in an amount ratio from 10 to 30 wt % relative to the total weight amount of the positive electrode active material. If the amount of the second lithium cobalt oxide is less than 10 wt %, the improving effect due to the formation of the lithium deficient structure may be trivial, and if the amount is greater than 30 wt %, capacity may decrease, and the structural may be collapsed.

In the present invention, the amount of the second lithium cobalt oxide having the lithium deficient structure may be obtained by identifying Li surface deficient structure in the shell by the analysis using TEM, measuring the thickness thereof, and obtaining total volume ratio and amount ratio, or by dissolving the lithium cobalt oxide particle from the surface little by little by controlling the dissolving time in a weak acid during an ICP analysis, analyzing the ratio of Li/transition metal (for example, Co) from the remaining solution, and measuring the amount of undissolved part.

The positive electrode active material according to an embodiment of the present invention has a monolith structure formed from the first particles of the lithium cobalt oxide.

In the present invention, a "monolith structure" means a structure present in an independent phase in which particles have a morphology phase and are not agglomerated each other. A particle structure in contrast to the monolith structure may include a structure forming a relatively large-sized particle shape (second particles) via physical and/or chemical agglomeration of relatively small-sized particles (first particles).

Generally, the size of the particles of the positive electrode active material is preferably large for attaining a high capacity of a battery, however in this case, the surface area is relatively small, and the active area making a contact with an electrolyte decreases, thereby deteriorating rate characteristic and an initial capacity. In order to solve the defects, a positive electrode active material of a second particle phase obtained by assembling the first particles of minute particles are mainly used. However, in the positive electrode active material with the granulated second particles, lithium ions may react with humidity or $CO_2$ in the air to easily form surface impurities such as $Li_2CO_3$, and LiOH while moving toward the surface of the active material, and the surface impurities thus formed may reduce the capacity of a battery or may be decomposed and generate gas in the battery, thereby generating the swelling of the battery. Therefore, the stability at high temperatures may become serious. However, since the lithium cobalt oxide particles forming the positive electrode active material according to an embodiment of the present invention have the monolith structure, there would be no worries on the generation of the defects of the positive electrode active material having the secondary particle phase.

The lithium cobalt oxide particles having the monolith structure may have an average particle diameter ($D_{50}$) from 3 μm to 50 μm in consideration of the specific surface area and the density of a positive electrode mixture and may have a greater average particle diameter ($D_{50}$) from 10 μm to 50 μm due to the structural characteristic enabling the easy intercalation and deintercalation of lithium ions when compared to a common positive electrode active material.

In the present invention, the average particle diameter ($D_{50}$) of the lithium cobalt oxide particles may be defined by the particle diameter on the basis of the particle diameter at 50% distribution. The average particle diameter ($D_{50}$) of the lithium cobalt oxide particles may be measured using, for example, a laser diffraction method, particularly, by dispersing the lithium cobalt oxide particles in a dispersion medium, introducing thereof to a commercially available laser diffraction particle size measuring apparatus (for example, Microtrac MT 3000), irradiating ultrasonic waves of about 28 kHz with the output of 60 W, and computing the average particle diameter ($D_{50}$) on the basis of the particle diameter at 50% distribution in the measuring apparatus.

Meanwhile, in the positive electrode active material for a lithium secondary battery according to an embodiment of the present invention, a surface treatment layer blocking the contact of the lithium cobalt oxide particles with an electrolyte, thereby restraining the generation of a side reaction, and at the same time, increasing the packing density of the positive electrode active material, is present on the surface of the lithium cobalt oxide particle.

The surface treatment layer includes a lithium compound including at least one element selected from the group consisting of transition metals and elements in group 13, particularly, a lithium compound including at least one element selected from the group consisting of nickel (Ni), manganese (Mn), cobalt (Co), and boron (B), and more particularly, a lithium transition metal oxide having a spinel-type crystal structure allowing the three-dimensional transport of lithium ions, or a lithium borate compound restraining the side reaction of the positive electrode active material with an electrolyte and at the same time, having good lithium conductivity.

In the case where the surface treatment layer includes the lithium transition metal oxide, the lithium transition metal oxide may particularly be a composite oxide of at least one transition metal selected from the group consisting of cobalt, manganese, and nickel with lithium, and more particularly be $LiCo_2O_4$, $LiMn_2O_4$, $LiNi_2O_4$, $LiNi_mMn_{2-m}O_4$ (where 0<m<2), or $LiNi_mMn_nCo_{2-m-n}O_4$ (where 0<m<2, 0<n<2, and 0<m+n<2), or a mixture of two or more thereof.

The lithium transition metal oxide of the spinel-type crystal structure may be included in an amount ratio from 0.01 to 20 wt % relative to the total amount of the positive electrode active material. If the amount of the lithium transition metal oxide is less than 0.01 wt % relative to the total amount of the positive electrode active material, the improving effect according to the formation of the surface treatment layer of the lithium transition metal oxide of the spinel-type structure may be trivial, and if the amount is greater than 20 wt %, the migration length of the lithium may increase, and resistance may increase, thereby rather deteriorating battery properties.

In addition, in the case where the surface treatment layer includes a lithium borate compound, the lithium borate compound may particularly be $LiBO_2$, $Li_2B_4O_7$, or $LiB_3O_6$, or may be a mixture of two or more thereof.

The lithium borate compound may be included in an amount ratio from 0.01 to 0.1 wt % relative to the total amount of the positive electrode active material. If the amount of the lithium borate compound is less than 0.01 wt % relative to the total amount of the positive electrode active material, the improving effect due to the formation of the surface treatment layer of the lithium borate compound may be trivial, and if the amount is greater than 0.1 wt %, the electrochemical capacity of the positive electrode active material may decrease, and battery properties may be rather deteriorated.

In the present invention, the amount of lithium and a transition metal in the lithium transition metal oxide or the lithium borate compound included in the surface treatment layer may be measured using an inductively coupled plasma-atomic emission spectrometer (ICP-AES), and the shape of the lithium transition metal oxide may be identified using a time of flight secondary ion mass spectrometry (ToF-SIMS).

In addition, in the positive electrode active material according to an embodiment of the present invention, the surface treatment layer may be formed with a thickness ratio from 0.001 to 1 with respect to the average particle diameter of the lithium cobalt oxide particle. If the thickness ratio of the surface treatment layer with respect to the lithium cobalt oxide particle is less than 0.001, the improving effect due to the formation of the surface treatment layer may be trivial, and if the thickness ratio is greater than 1, resistance may increase due to the increase of the lithium migration length in the surface treatment layer, and battery properties may be deteriorated.

The positive electrode active material having the above-described structure according to an embodiment of the present invention may be prepared by a preparation method including preparing second lithium cobalt oxide particles by mixing a cobalt raw material and a lithium raw material in amounts satisfying the relation of $1 \leq Li/Co$ molar ratio, and first heating (Step 1), second heating the second lithium cobalt oxide particles, at least once, to prepare lithium cobalt oxide particles including lithium deficient first lithium cobalt oxide having a Li/Co molar ratio of less than 1 in a surface side of the particle (Step 2); and forming a surface treatment layer including a lithium compound including at least one element selected from the group consisting of transition metals and elements in group 13, on the surface of the lithium cobalt oxide particle (Step 3). According to another embodiment of the present invention, a method of preparing the positive electrode active material for a lithium secondary battery is provided.

Hereinafter, each step will be described in detail, and Step 1 is a step for preparing second lithium cobalt oxide particles.

Particularly, the first lithium cobalt particle may be manufactured by mixing the cobalt raw material and the lithium raw material in amounts satisfying the relation of $1 \leq Li/Co$ molar ratio, and first heating.

In this case, the cobalt raw material may particularly be a cobalt-containing oxide, hydroxide, oxyhydroxide, halogenide, nitrate, carbonate, acetate, oxalate, citrate, or sulfate, and may more particularly be $Co(OH)_2$, $CoO$, $CoOOH$, $Co(OCOCH_3)_2 \cdot 4H_2O$, $Co(NO_3)_2 \cdot 6H_2O$, or $Co(SO_4)_2 \cdot 7H_2O$, or may be a mixture of one or more thereof.

The lithium raw material may particularly be a lithium-containing oxide, hydroxide, oxyhydroxide, halogenide, nitrate, carbonate, acetate, oxalate, citrate, or sulfate, and may more particularly be $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, or may be a mixture of one or more thereof.

The cobalt raw material and the lithium raw material may be mixed in amounts such that a Li/Co molar ratio satisfies the relation of $1 \leq Li/Co$ molar ratio. With the mixing amount range, a core including lithium rich lithium cobalt oxide having a layered structure may be formed. More particularly, in consideration of remarkable improving effect, the cobalt raw material and the lithium raw material may be mixed in amounts such that a Li/Co molar ratio satisfies the relation of $1 \leq Li/Co$ molar ratio $\leq 1.2$, and more particularly, the relation of $1 \leq Li/Co$ molar ratio $\leq 1.1$. In addition, the decreasing concentration gradient from the center to the surface of the particle in the second lithium cobalt oxide particle may be attained by injecting the cobalt raw material and the lithium raw material such that a Li/Co molar ratio may decrease within a range of $1 \leq Li/Co$ molar ratio $\leq 1.2$ according to the lapse of time.

In the case where the second lithium cobalt oxide thus prepared is doped, the raw material of a metal element (M') for doping may be selectively added further during mixing the cobalt raw material and the lithium raw material.

The raw material of the metal element (M') for doping may particularly be at least one metal selected from the group consisting of W, Mo, Zr, Ti, Mg, Ta, Al, Fe, V, Cr, Ba, Ca, and Nb, or an oxide, a hydroxide, an oxyhydroxide, a halogenide, a nitrate, a carbonate, an acetate, an oxalate, a citrate, or a sulfate including thereof, or a mixture of one or more thereof may be used.

The first heating of the mixture of the raw materials may be conducted at a temperature from 800° C. to 1,100° C. If the heating temperature is less than 800° C., an unreacted raw material may remain, and discharge capacity per unit weight may be decreased, and cycle property and an operation voltage may be deteriorated. If the heating temperature is greater than 1,100° C., by-products may be produced, and discharge capacity per unit weight may be decreased, and cycle property and an operation voltage may be deteriorated.

The first heating may preferably be conducted at temperatures lower than temperatures for the following second heating and within the above-described temperature range so as to easily control the diffusion rate of lithium.

In addition, the first heating may be conducted in the air or under an oxygen atmosphere for 5 to 30 hours for sufficient diffusion between particles of the mixture.

Then, Step 2 is a step for preparing a first lithium cobalt oxide layer having a lithium deficient structure in the surface of the second lithium cobalt oxide particles prepared in Step 1.

Particularly, the lithium deficient first lithium cobalt oxide may be prepared by second heating the second lithium cobalt oxide particles prepared in Step 1 at from 800° C. to 1,100° C., at least once, more particularly, from one to three times, and still more particularly, once or twice. In this case, the temperature for each heating may be the same or different within the temperature range.

According to the formation of lithium oxide by the reaction of lithium present at the surface of the second lithium cobalt oxide particles with oxygen in the air during the second heating, the lithium deficient first lithium cobalt oxide may be formed. In addition, as the number of the second heating increases, the lithium deficiency in the lithium cobalt oxide may be also increased, and as a result, concentration gradient with decreasing lithium concentration from the center to the surface of the first lithium cobalt oxide may be formed.

During the second heating, a cobalt raw material, or a cobalt raw material and a lithium raw material may be selectively added further. The materials may be added all at once, or separately in each step with the same amount or different amounts step by step.

Particularly, in the case where only the cobalt raw material is selectively added further, the cobalt in the cobalt raw material and the lithium present at the surface of the second lithium cobalt oxide particles may be subjected to a reaction so as to produce lithium deficient lithium cobalt oxide having a Li/Co molar ratio of less than 1. In this case, the cobalt raw material may be the same as those described above, and the amount used may be appropriately controlled according to the concentration gradient of Li.

In the case where the cobalt raw material and the lithium raw material are selectively added further, the cobalt raw material and the lithium raw material may be added in amounts satisfying the relation of 0<Li/Co molar ratio<1, or 0.95≤Li/Co molar ratio<1, and more particularly, the relation of 0.95≤Li/Co molar ratio≤0.99. With the mixing amounts of the cobalt raw material and the lithium raw material, a layer including lithium deficient lithium cobalt oxide may be formed. In this case, the cobalt raw material and the lithium raw material may be the same as those described in Step 1.

In the case where the first lithium cobalt oxide thus prepared is doped, the raw material of a metal element (M) for doping may be selectively added further during mixing the cobalt raw material and the lithium raw material.

The raw material of the metal element (M) for doping may particularly be at least one metal selected from the group consisting of W, Mo, Zr, Ti, Mg, Ta, Al, Fe, V, Cr, Ba, Ca, and Nb, or an oxide, a hydroxide, an oxyhydroxide, a halogenide, a nitrate, a carbonate, an acetate, an oxalate, a citrate, or a sulfate including thereof, or a mixture of one or more thereof may be used.

Meanwhile, the second heating in Step 2 may be conducted at a temperature from 800° C. to 1,100° C. If the heating temperature is less than 800° C., the crystallization of lithium cobalt oxide formed in the surface may be insufficiently proceed, and the transport of lithium ions may be inhibited. If the heating temperature is greater than 1,100° C., the crystallization may be excessively proceed, or an unstable structure may be formed due to the evaporation of Li in a crystal structure. The second heating in Step 2 may preferably be conducted at a temperature from 1,000° C. to 1,100° C. to prevent the deterioration of discharge capacity per unit weight and the deterioration of cycle property and an operation voltage, due to a remaining unreacted raw material, the production of by-products, and the non-crystallization or over-crystallization of the lithium cobalt oxide thus produced.

Since the transport and the diffusion of the lithium in the positive electrode active material may be promoted with the increase of the second heating temperature, the distribution of the lithium in the positive electrode active material may be controlled according to the second heating temperature. Particularly, in the case where the second heating temperature within the temperature range is 1,000° C. or more, or from 1,000° C. to 1,100° C., the lithium may be distributed with concentration gradient in the active material.

In addition, the second heating may be conducted in the air or under an oxygen atmosphere for 7 to 50 hours. If the heating time is excessively long, the evaporation of the lithium and the crystallinity of the metal oxide layer formed on the surface may increase, thereby inducing limitations on the transport of the Li+.

Step 3 is a step for forming a surface treatment layer on the surface of the lithium cobalt oxide particle prepared in Step 2.

Particularly, the surface treatment layer may be formed by a method of mixing the lithium cobalt oxide particles prepared in Step 2, and a lithium compound including at least one element selected from the group consisting of transition metals and elements in group 13, more particularly, a lithium transition metal oxide having a spinel-type crystal structure, or a lithium borate compound, and heating. In this case, the kinds and amounts of the lithium transition metal oxide and the lithium borate compound having the spinel-type structure may be the same as described above.

In addition, the heating may be conducted at a temperature from 650° C. to 800° C. in the air or under an oxygen atmosphere for 7 to 50 hours.

The preparation method of the positive electrode active material according to an embodiment of the present invention is a dry method not using a solvent.

In a wet method using a solvent for preparing a positive electrode active material and for surface treating, a metal precursor is used after dissolving in a solvent, and the pH change of the solvent may be easy, and the size of the positive electrode active material finally prepared may be easily changed, or particle cleavage may be induced. In addition, Li ions may be eluted from the surface of the positive electrode active material including Li, and various oxides may be formed as by-products at the surface. On the contrary, the positive electrode active material may be prepared by the dry method in the present invention, the defects due to the use of the solvent may not be generated, and the preparation efficiency and the process availability of the active material may be good. In addition, according to the surface treatment by the dry method, a binder is not used, and by-products due to the use of the binder may not be generated.

Since the positive electrode active material prepared by the above-described preparation method includes lithium cobalt oxide having a lithium deficient structure, by which the intercalation and the deintercalation of lithium may be easy, in the surface side of the lithium cobalt oxide particles having a monolith structure, and includes a surface treatment layer including lithium transition metal oxide or a lithium borate compound having a spinel-type crystal structure on the surface of the particle, a side reaction with an electrolyte may be restrained, and high packing density may be attained, thereby realizing high capacity property, and improved rate characteristic and initial capacity property. Particularly, in the case where the surface treatment layer includes the lithium transition metal compound of a spinel-type crystal structure allowing three-dimensional transport of lithium, high voltage property may be obtained without worrying on low rate characteristic and the deterioration of initial capacity property even with large-sized particles. In addition, in the case where the surface treatment layer includes the lithium borate compound, a side reaction with an electrolyte with respect to the surface of the particle may be restrained, and at the same time, good lithium conductivity may be obtained, thereby improving the output property and life property of a battery.

According to another embodiment of the present invention, a positive electrode and a lithium secondary battery including the positive electrode active material are provided.

Particularly, the positive electrode may include a positive electrode current collector, and a positive electrode active material layer formed on the positive electrode current collector and including the positive electrode active material.

The positive electrode current collector may use any material that may not induce the chemical change of a battery and have conductivity, without specific limitation, and may include, for example, stainless steel, aluminum, nickel, titanium, baked carbon, or a surface treated material of aluminum or stainless steel with carbon, nickel, titanium, silver, etc. Generally, the positive electrode current collector may have a thickness from 3 to 500 µm, and the adhesiveness of the positive electrode active material may be increased by forming minute embossing on the surface of the current collector. For example, various shapes including a film, a sheet, a foil, a net, a porous body, a foamed body, a non-woven fabric body, etc. may be used.

Meanwhile, the positive electrode active material layer may include a conductive material and a binder together with the positive electrode active material. In this case, the positive electrode active material may be the same as those described above.

The conductive material is used to impart an electrode with conductivity, and any material that may not induce chemical change in a battery and have electron conductivity may be used, without specific limitation. Particular example may include graphite such as natural graphite and synthetic graphite; a carbon-based material such as carbon black, acetylene black, ketchen black, channel black, furnace black, lamp black, thermal black, and carbon fibers; a metal powder or a metal fiber of copper, nickel, aluminum, silver, or the like; conductive whisker such as zinc oxide, and potassium titanate; a conductive metal oxide such as titanium oxide; or a conductive polymer such as polyphenylene derivatives, and the material may be used alone or as a mixture of two or more. Generally, the conductive material may be included in an amount ratio from 1 to 30 wt % relative to the total weight amount of the positive electrode active material layer.

The binder plays the role of improving adhesiveness between the positive electrode active material particles, and between the positive electrode active material and the current collector. Particularly, polyvinylidene fluoride (PVDF), vinylidenefluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, a styrene butadiene rubber (SBR), a fluorine rubber, or diverse copolymers thereof may be used, and the material may be used alone or as a mixture of two or more. The binder may be included in an amount ratio from 1 to 30 wt % relative to the total weight amount of the positive electrode active material layer.

The positive electrode having the above-described structure may be manufactured by a common method of manufacturing a positive electrode except for using the positive electrode active material. Particularly, a composition for forming a positive electrode active material layer obtained by dissolving and dispersing the positive electrode active material, the binder, and the conductive material in a solvent may be applied on the positive electrode current collector, dried, and rolled to manufacture the positive electrode active material layer. In this case, the kind and the amount of the positive electrode active material, the binder, and the conductive material are the same as those described above.

In addition, the solvent in the composition for forming the positive electrode active material layer may be a commonly used solvent in the art and may be dimethyl sulfoxide (DMSO), isopropyl alcohol, N-methylpyrrolidone (NMP), acetone, or water, and the solvent may be used alone or as a mixture of two or more. The amount used of the solvent may be sufficient if the composition has a viscosity capable of forming good thickness uniformity during applying for manufacturing a positive electrode after dissolving or dispersing the positive electrode active material, the conductive material, and the binder therein, in consideration of the applying thickness of a slurry and a production yield.

According to another method, the positive electrode may be manufactured by laminating a film obtained by casting the composition of the positive electrode active material on a separate support and separating from the support, on the positive electrode current collector.

According to a further another embodiment, an electrochemical device including the positive electrode is provided. The electrochemical device may particularly be a battery or a capacitor, and may more particularly be a lithium secondary battery.

The lithium secondary batter may include a positive electrode, a negative electrode facing the positive electrode, a separator disposed between the positive electrode and the negative electrode, and an electrolyte. The positive electrode is the same as described above. In addition, the lithium secondary battery may further and selectively include a battery vessel receiving an electrode assembly of the positive electrode, the negative electrode, and the separator, and a sealing member for sealing the battery vessel.

In the lithium secondary battery, the negative electrode may include a negative electrode current collector, and a negative electrode active material layer disposed on the negative electrode current collector.

The negative electrode current collector may be any material that may not induce the chemical change of a battery and have conductivity, without specific limitation, and may include, for example, copper, stainless steel, aluminum, nickel, titanium, baked carbon, a surface treated material of copper or stainless steel with carbon, nickel, titanium, or silver, or an alloy of aluminum-cadmium. Generally, the negative electrode current collector may have a thickness from 3 to 500 µm, and the adhesiveness of the negative electrode active material may be reinforced by forming minute embossing on the surface of the current collector as in the positive electrode current collector. For example, various shapes including a film, a sheet, a foil, a net, a porous body, a foamed body, a non-woven fabric body, etc. may be used.

The negative electrode active material layer may selectively include a binder and a conductive material together with the negative electrode active material. The negative electrode active material layer may be manufactured by, for example, applying a composition for forming a negative electrode including a negative electrode active material, and selectively a binder and a conductive material on a negative electrode current collector, and drying, or may be manufactured by laminating a film obtained by casting the composition for forming the negative electrode on a separate support and separating from the support, on the negative electrode current collector.

The negative electrode active material may be a compound capable of performing reversible intercalation and deintercalation of lithium. Particular examples may include a carbon material such as synthetic graphite, natural graphite, graphitized carbon fiber, and amorphous carbon; a metallic compound capable of forming an alloy with lithium such as Si, Al, Sn, Pb, Zn, Bi, In, Mg, Ga, Cd, an Si alloy, an Sn alloy, and an Al alloy; a metal oxide capable of doping and dedoping lithium such as $SiO_x$ (0<x<2), $SnO_2$, vanadium oxide, and lithium vanadium oxide; a composite including the metallic compound and the carbon material such as an Si—C composite or an Sn—C composite, and a mixture of one or more thereof may be used. In addition, a metal lithium thin film may be used as the negative electrode active material. As the carbon material, both carbon with low crystallinity and carbon with high crystallinity may be used. The carbon with low crystallinity may typically include soft carbon and hard carbon, and the carbon with high crystallinity may typically include amorphous, platy, scaly, spherical or fibrous natural graphite or synthetic graphite, and baked carbon at high temperatures such as kish graphite, pyrolytic carbon, mesophase pitch based carbon fiber, meso-carbon microbeads, mesophase pitches, and petroleum or coal tar pitch derived cokes.

The binder and the conductive material may be the same as those illustrated in the description of the positive electrode.

Meanwhile, the separator in the lithium secondary battery separates a negative electrode and a positive electrode and provides a transport passage of lithium ions. The separator may be any one used in a common lithium secondary battery, without specific limitation, and particularly, a separator having low resistance to the ion transport in an electrolyte and good impregnation capacity of the electrolyte may be preferable. Particularly, a porous polymer film, for example, a porous polymer film prepared using a polyolefin polymer such as an ethylene homopolymer, a propylene homopolymer, an ethylene/butene copolymer, an ethylene/hexene copolymer, and an ethylene/methacrylate copolymer, or a layered structure of two or more thereof may be used. In addition, a commonly used porous non-woven fabric, for example, a non-woven fabric formed using a glass fiber having a high melting point, a polyethylene terephthalate fiber, etc. may be used. Further, a coated separator including a ceramic component or a polymer material may be used for securing heat resistance or mechanical strength, and a single layer structure or a multilayer structure may be selectively used.

As the electrolyte used in the present invention, an organic liquid electrolyte, an inorganic liquid electrolyte, a solid polymer electrolyte, a gel type polymer electrolyte, a solid inorganic electrolyte, a melting inorganic electrolyte, etc. may be used, without limitation.

Particularly, the electrolyte may include an organic solvent and a lithium salt.

As the organic solvent, any solvent that may play the role of a medium for transporting ions participating in the electrochemical reaction of a battery may be used, without specific limitation. Particularly, the organic solvent may include an ester solvent such as methyl acetate, ethyl acetate, γ-butyrolactone, and ε-caprolactone; an ether solvent such as dibutyl ether, and tetrahydrofuran; a ketone solvent such as cyclohexanone; an aromatic hydrocarbon solvent such as fluorobenzene; a carbonate solvent such as dimethyl carbonate (DMC), diethyl carbonate (DEC), methyl ethyl carbonate (MEC), ethyl methyl carbonate (EMC), ethylene carbonate (EC), and propylene carbonate (PC); an alcohol solvent such as ethyl alcohol, and isopropyl alcohol; nitriles such as R—CN (where R is C2-C20 linear or branched cyclic hydrocarbon group and may include a double bond, an aromatic ring or an ether bond); amides such as dimethyl formamide; dioxolanes such as 1,3-dioxolane; or sulfolanes. Among the solvents, the carbonate solvent is preferable, and a mixture of a cyclic carbonate having high ion conductivity and high dielectricity (for example, ethylene carbonate or propylene carbonate) and a linear carbonate compound having a low viscosity (for example, ethyl methyl carbonate, dimethyl carbonate, or diethyl carbonate) is more preferable. In this case, the cyclic carbonate and a chain carbonate may be mixed in a volume ratio from about 1:1 to about 1:9 for attaining good electrolyte performance.

The lithium salt may be any compound capable of providing lithium ions used in a lithium secondary battery, without specific limitation. Particularly, the lithium salt may include $LiPF_6$, $LiClO_4$, $LiAsF_6$, $LiBF_4$, $LiSbF_4$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt may be within a range from 0.1 to 2.0 M. If the concentration of the lithium salt is in the range, an electrolyte may have an appropriate conductivity and viscosity, thereby providing good electrolyte performance and effective transport of lithium ions.

In the electrolyte, at least one additive such as a haloalkylene carbonate compound such as difluoroethylene carbonate, pyridine, triethyl phosphite, triethanolamine, cycle ether, ethylenediamine, n-glyme, hexaphosphoric acid triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxyethanol, and trichloroaluminum other than the components of the electrolyte in order to improve the life property of a battery, to restrain the capacity decrease of a battery, to improve the discharge capacity of a battery, etc. The additive may be included in an amount ratio from 0.1 to 5 wt % relative to the total weight amount of the electrolyte.

A lithium secondary battery including the positive electrode active material according to the present invention has good discharge capacity and output property, and stable capacity maintenance rate, and may be usefully used in a portable device such as a cellular phone, a laptop computer, and a digital camera, and an electric vehicle field including a hybrid electric vehicle (HEV), etc.

According to another aspect of the present invention, there are provided a battery module including the lithium secondary battery as a unit cell and a battery pack including the battery module.

The battery module or the battery pack may be used as a power source of at least one medium and large size device of power tools; electric vehicles such as an electric vehicle (EV), a hybrid electric vehicle, and a plug-in hybrid electric vehicle (PHEV); or an energy storage system.

Hereinafter, the present invention will be explained in more detail referring to the following examples. However, the examples may include various different modifications, and the scope of the present invention is not limited thereto.

Preparation Example 1: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours. The powder thus obtained was ground and screened to prepare second lithium cobalt oxide particles.

The second lithium cobalt oxide particles thus prepared was dry mixed with a $Li_2CO_3$ powder and a $Co_3O_4$ powder in certain amounts such that a Li/Co molar ratio was 0.95, followed by second heating at 1,050° C. for 20 hours to prepare lithium cobalt oxide particles (Average particle diameter: 12 μm), in which lithium was distributed with a decreasing concentration gradient from the center to the surface of a particle over the whole particles.

Then, a positive electrode active material with a monolith structure was prepared by forming a surface treatment layer (Thickness: about 100 nm) surrounding the surface of the lithium cobalt oxide particle by homogeneously mixing the lithium cobalt oxide particles with $LiCo_2O_4$ as lithium transition metal oxide having a spinel-type crystal structure, and heating in the air at 800° C. for 10 hours. In this case, $LiCo_2O_4$ was used in an amount ratio of 0.01 wt % relative to the total amount of the positive electrode active material finally prepared. The amount of $LiCo_2O_4$ was confirmed via ICP-AES, and the shape of the lithium transition metal oxide in the surface treatment layer was identified via ToF-SIMS.

Preparation Example 2: Preparation of Positive Electrode Active Material

A positive electrode active material was prepared by conducting the same procedure described in Preparation Example 1 except for using $LiMn_2O_4$ as the lithium transition metal oxide having a spinel-type structure.

Preparation Example 3: Preparation of Positive Electrode Active Material

A positive electrode active material was prepared by conducting the same procedure described in Preparation Example 1 except for using $LiNi_{0.5}Mn_{1.5}O_4$ as the lithium transition metal oxide with a spinel-type structure.

Preparation Example 4: Preparation of Positive Electrode Active Material

A $Li_2CO_3$ powder and a $Co_3O_4$ powder were mixed in certain amounts such that a Li/Co molar ratio was 1.02, followed by first heating at 900° C. for 10 hours. The powder thus obtained was ground and screened to prepare second lithium cobalt oxide particles.

The second lithium cobalt oxide particles thus prepared were dry mixed with a $Li_2CO_3$ powder and a $Co_3O_4$ powder in certain amounts such that a Li/Co molar ratio was 0.95, followed by second heating at 1,050° C. for 20 hours to prepare lithium cobalt oxide particles (Average particle diameter: 12 μm), in which lithium was distributed with a decreasing concentration gradient from the center to the surface of a particle over the whole particles.

Then, a positive electrode active material with a monolith structure was prepared by forming a surface treatment layer (Thickness: about 100 nm) surrounding the surface of the lithium cobalt oxide particle by homogeneously mixing the lithium cobalt oxide particles with $LiBO_2$ as a lithium borate compound, and heating in the air at 800° C. for 10 hours. In this case, $LiBO_2$ was used in an amount ratio of 0.01 wt % relative to the total amount of the positive electrode active material finally prepared.

Preparation Example 5: Preparation of Positive Electrode Active Material

A positive electrode active material was prepared by conducting the same procedure described in Preparation Example 4 except for using $Li_2B_4O_7$ as the lithium borate compound.

Preparation Example 6: Preparation of Positive Electrode Active Material

A positive electrode active material was prepared by conducting the same procedure described in Preparation Example 4 except for using $LiB_3O_6$ as the lithium borate compound.

Preparation Example 7: Preparation of Positive Electrode Active Material

A positive electrode active material including a surface treatment layer including $LiAlO_4$ formed on the surface thereof was prepared by conducting the same procedure described in Preparation Example 4 except for using $LiAlO_4$ instead of the lithium borate compound ($LiBO_2$).

Preparation Example 8: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours. The powder thus obtained was ground and screened to prepare second lithium cobalt oxide particles.

The second lithium cobalt oxide particles thus prepared were dry mixed with a $Li_2CO_3$ powder and a $Co_3O_4$ powder in certain amounts such that a Li/Co molar ratio was 0.95, followed by second heating at 900° C. for 20 hours to prepare lithium cobalt oxide particles (Average particle diameter: 12 μm) including first lithium cobalt oxide with a lithium deficient structure, in the surface side of the particles.

Then, a positive electrode active material with a monolith structure having a surface treatment layer of $LiBO_2$ was prepared by conducting the same procedure described in Preparation Example 4 except for using the lithium cobalt oxide particles thus prepared.

Preparation Example 9: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours. The powder thus obtained was ground and screened to prepare second lithium cobalt oxide particles.

The second lithium cobalt oxide particles thus prepared were dry mixed with a $Li_2CO_3$ powder and a $Co_3O_4$ powder in certain amounts such that a Li/Co molar ratio was 0.95, and MgO and $TiO_2$ powders were additionally added in certain amounts such that 0.01 mol of each Mg and Ti metal relative to 1 mol of Li was added and mixed, followed by second heating at 1,050° C. for 20 hours to prepare lithium cobalt oxide particles (Average particle diameter: 12 μm), in which lithium was distributed with a decreasing concentration gradient from the center to the surface of a particle over the whole particles, and first lithium cobalt oxide with a lithium deficient structure doped with Mg and Ti was included in a shell part.

Then, a positive electrode active material with a monolith structure was prepared by forming a surface treatment layer (Thickness: 100 nm) surrounding the surface of the lithium cobalt oxide particle by homogeneously mixing the lithium cobalt oxide particles with $LiBo_2$, and heating in the air at 800° C. for 10 hours. In this case, $LiBO_2$ was used in an amount ratio of 0.05 wt % relative to the total amount of the positive electrode active material finally prepared.

A positive electrode active material with a surface treatment layer of $LiBO_2$ was prepared by conducting the same procedure described in Preparation Example 4 except for using the lithium cobalt oxide particles thus prepared.

Preparation Example 10: Preparation of Positive Electrode Active Material

A $Li_2CO_3$ powder and a $Co_3O_4$ powder were mixed in certain amounts such that a Li/Co molar ratio was gradually decreased according to the lapse of time within a range from 1.0 to 1.02, followed by first heating at 900° C. for 10 hours. The powder thus obtained was ground and screened to prepare second lithium cobalt oxide particles.

The second lithium cobalt oxide particles thus prepared were dry mixed with a $Li_2CO_3$ powder and a $Co_3O_4$ powder in certain amounts such that a Li/Co molar ratio was 0.95, followed by second heating at 1,050° C. for 20 hours to prepare lithium cobalt oxide particles (Average particle diameter: 10 µm), in which lithium was distributed with a decreasing concentration gradient from the center to the surface of a particle over the whole particles.

A positive electrode active material with a monolith structure and having an $LiBO_2$ surface treatment layer was prepared by conducting the same procedure described in Preparation Example 4 except for using the lithium cobalt oxide particles thus prepared.

Preparation Example 11: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours to prepare second lithium cobalt oxide particles.

The second lithium cobalt oxide particles thus prepared were heated under an oxygen atmosphere at 900° C. for 5 hours, and this procedure was repeated to prepare lithium cobalt oxide particles (Average particle diameter: 10 µm), in which lithium cobalt oxide with a lithium deficient structure was distributed with a concentration gradient in the surface side of the particle.

A positive electrode active material with a monolith structure and having an $LiBO_2$ surface treatment layer was prepared by conducting the same procedure described in Preparation Example 4 except for using the lithium cobalt oxide particles thus prepared.

Preparation Example 12: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours to prepare second lithium cobalt oxide particles.

The second lithium cobalt oxide particles thus prepared were heated under an oxygen atmosphere at 900° C. for 5 hours, and this procedure was repeated. In each heating step, $Co_3O_4$ was added in an amount of 0.05 mol and 0.25 mol, respectively. As a result, lithium cobalt oxide particles (Average particle diameter: 10 µm), in which lithium cobalt oxide with a lithium deficient structure was distributed with a concentration gradient in the surface side of the particle were prepared.

A positive electrode active material with a monolith structure and having an $LiBO_2$ surface treatment layer was prepared by conducting the same procedure described in Preparation Example 4 except for using the lithium cobalt oxide particles thus prepared.

Preparation Example 13: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours. The powder thus obtained was ground and screened to prepare second lithium cobalt oxide particles.

The second lithium cobalt oxide particles thus prepared were dry mixed with a $Li_2CO_3$ powder and a $Co_3O_4$ powder in certain amounts such that a Li/Co molar ratio was 0.95, and a $ZrO_2$ powder was additionally added in an amount such that a Zr metal was 0.01 mol relative to 1 mol of Li, and mixed, followed by second heating at 1,050° C. for 20 hours to prepare lithium cobalt oxide particles (Average particle diameter ($D_{50}$): 10 µm), in which lithium cobalt oxide with a lithium deficient structure was distributed with a concentration gradient in the surface side of the particle, and the lithium cobalt oxide with a lithium deficient structure was doped with Zr.

A positive electrode active material with a monolith structure having an $LiBO_2$ surface treatment layer was prepared by conducting the same procedure described in Preparation Example 4 except for using the lithium cobalt oxide particles thus prepared.

Examples 1 to 13: Manufacture of Lithium Secondary Batteries

Lithium secondary batteries were manufactured using each positive electrode active material prepared in Preparation Examples 1 to 13.

In detail, each positive electrode active material prepared in Preparation Examples 1 to 13, a carbon black conductive material, and a PVdF binder were mixed in an N-methyl pyrrolidone solvent in a weight ratio of 90:5:5 to prepare a composition (Viscosity: 5,000 mPa·s) for forming a positive electrode. The composition was applied on an aluminum current collector, dried, and rolled to manufacture a positive electrode.

Mesocarbon microbead (MCMB) which is synthetic graphite as a negative electrode active material, a carbon black conductive material, and a PVdF binder were mixed in an N-methyl pyrrolidone solvent in a weight ratio of 85:10:5 to prepare a composition for forming a negative electrode. The composition was applied on a copper current collector to manufacture a negative electrode.

An electrode assembly was manufactured by disposing a porous polyethylene separator between the positive electrode and the negative electrode, and the electrode assembly was positioned in a case. An electrolyte was injected into the case to manufacture a lithium secondary battery. In this case, the electrolyte was prepared by dissolving 1.15 M of lithium hexafluorophosphate (LiPF$_6$) in an organic solvent including ethylene carbonate (EC)/dimethyl carbonate (DMC)/ethyl methyl carbonate (EMC) (Volume ratio of EC/DMC/EMC=3/4/3).

Comparative Example 1: Manufacture of Lithium Secondary Battery

A lithium secondary battery was manufactured by conducting the same procedure described in Example 1 except for using LiCoO$_2$ (Average particle diameter: 12 μm) as the positive electrode active material.

Comparative Example 2: Manufacture of Lithium Secondary Battery

A positive electrode active material with an LiCo$_2$O$_4$ surface treatment layer formed on LiCoO$_2$ was manufactured by conducting the same procedure described in Preparation Example 1 except for using LiCoO$_2$ (Average particle diameter: 12 μm) as the lithium cobalt oxide particles.

A lithium secondary battery was manufactured by conducting the same procedure described in Example 1 except for using the positive electrode active material thus prepared.

Experimental Example 1

The molar ratio change of Li/Co was observed according to a depth profile from the surface to the inner part of an active material using an X-ray photoelectron spectroscopy (XPS) for lithium cobalt oxide particles prepared prior to forming surface treatment layers during preparing positive electrode active materials in Preparation Examples 1, 4, 8, and 10-12. The results are shown in the following Tables 1 and 2.

TABLE 1

| Depth from the surface of lithium cobalt oxide particle (nm) | Li/Co molar ratio | | |
|---|---|---|---|
| | Preparation Example 1 | Preparation Example 4 | Preparation Example 8 |
| 50 | 0.95 | 0.96 | 0.95 |
| 150 | 0.96 | 0.96 | 0.95 |
| 250 | 0.98 | 0.97 | 0.95 |
| 300 | 0.98 | 0.98 | 0.95 |
| 450 | 0.99 | 0.99 | 0.95 |
| 500 | 1.00 | 1.00 | 1.00 |
| 1,000 | 1.00 | 1.00 | 1.00 |
| 1,500 | 1.00 | 1.00 | 1.00 |
| 2,000 | 1.00 | 1.00 | 1.00 |
| 2,500 | 1.00 | 1.00 | 1.00 |
| 3,000 | 1.00 | 1.00 | 1.00 |
| 3,500 | 1.00 | 1.00 | 1.00 |
| 4,000 | 1.02 | 1.02 | 1.00 |
| 4,500 | 1.02 | 1.02 | 1.00 |
| 5,000 | 1.02 | 1.02 | 1.00 |
| 5,500 | 1.02 | 1.02 | 1.00 |
| 6000 (particle center) | 1.02 | 1.02 | 1.00 |

TABLE 2

| Depth from the surface of positive electrode active material particle (nm) | Li/Co molar ratio | | |
|---|---|---|---|
| | Preparation Example 10 | Preparation Example 11 | Preparation Example 12 |
| 30 | 0.95 | 0.97 | 0.95 |
| 50 | 0.95 | 0.98 | 0.95 |
| 150 | 0.96 | 0.99 | 0.96 |
| 250 | 0.96 | 0.99 | 0.97 |
| 300 | 0.97 | 1.00 | 0.98 |
| 450 | 0.98 | 1.00 | 0.99 |
| 500 | 1.00 | 1.00 | 1.00 |
| 1,000 | 1.00 | 1.00 | 1.00 |
| 1,500 | 1.01 | 1.00 | 1.00 |
| 2,000 | 1.01 | 1.00 | 1.00 |
| 2,500 | 1.01 | 1.00 | 1.00 |
| 3,000 | 1.02 | 1.00 | 1.00 |
| 3,500 | 1.02 | 1.00 | 1.00 |
| 4,000 | 1.02 | 1.00 | 1.00 |
| 4,500 | 1.02 | 1.00 | 1.00 |
| 5000 (particle center) | 1.02 | 1.00 | 1.00 |

As shown in Tables 1 and 2, a shell including first lithium cobalt oxide having a lithium deficient structure was formed in a region corresponding to a distance ratio from 0.05 to 0.1 from the surface of the particle relative to the radius of the active material particle.

In addition, positive electrode active materials (Preparation Examples 1, 4, and 10) in which lithium is distributed with a decreasing concentration gradient from the center to the surface of a particle over the whole particles were prepared via the control of the heating temperature and the continuous change of the amount ratio of injecting materials during preparation, positive electrode active materials (Preparation Examples 11 and 12) in which lithium cobalt oxide with a lithium deficient structure was distributed with a concentration gradient only in the surface side of the particle were prepared by repeating second heating, and a positive electrode active material (Preparation Example 8) having no concentration gradient over the whole particles and including lithium deficient lithium cobalt oxide only in the surface side of a particle was prepared, respectively. For the preparation of the positive electrode active material of Preparation Example 12, the second heating was repeatedly conducted, and cobalt oxide reactive with lithium was injected in each heating step. Accordingly, the thickness of a shell part including the lithium deficient structure was greater, and the molar ratio of Li/Co in the shell part was rapidly changed.

Experimental Example 2

The lithium distribution in the surface side of the particle for the lithium cobalt oxide particles prepared in Preparation Example 11 was observed using an atom probe tomography (APT). The results are shown in FIG. 1.

Figure 1:
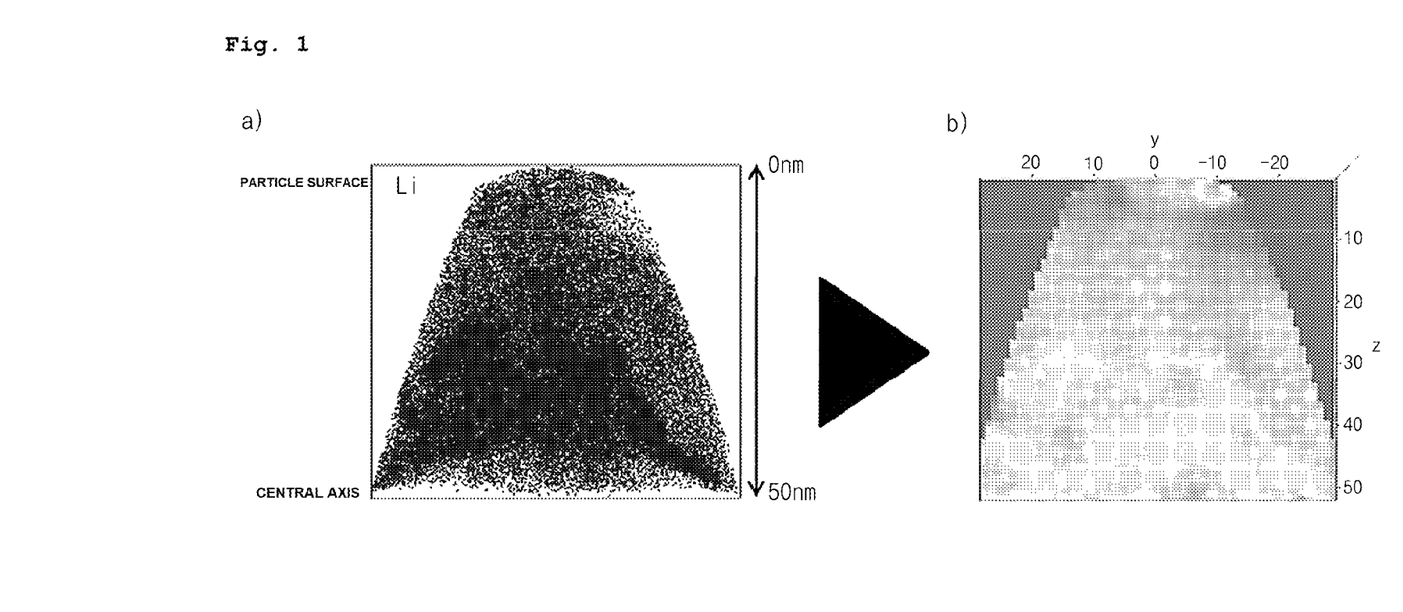
FIG. 1 illustrates photographic images for observing lithium distribution in the surface side of a particle in a lithium cobalt oxide particle prepared in Preparation Example 11 using an atom probe tomography (APT)

In FIG. 1, a) is a photographic image of lithium distribution in the surface side of the lithium cobalt oxide particle (to 50 nm from the surface to the center of the particle) of Preparation Example 11 observed by APT, and b) is a photographic image obtained by projecting 3D information in a) into 2D for measuring density.

As shown in FIG. 1, it would be confirmed that the density of lithium increases toward the center of the lithium cobalt oxide particle. Meanwhile, yellow lithium rich portion at the upper right end portion in FIG. 1 was due to experimental errors.

Experimental Example 3

The crystal structure of the lithium cobalt oxide particle prepared in Preparation Example 11 in the surface side and the inner part of an active material was observed using an electron diffraction analyzer. The results are shown in FIG. 2.

Figure 2:
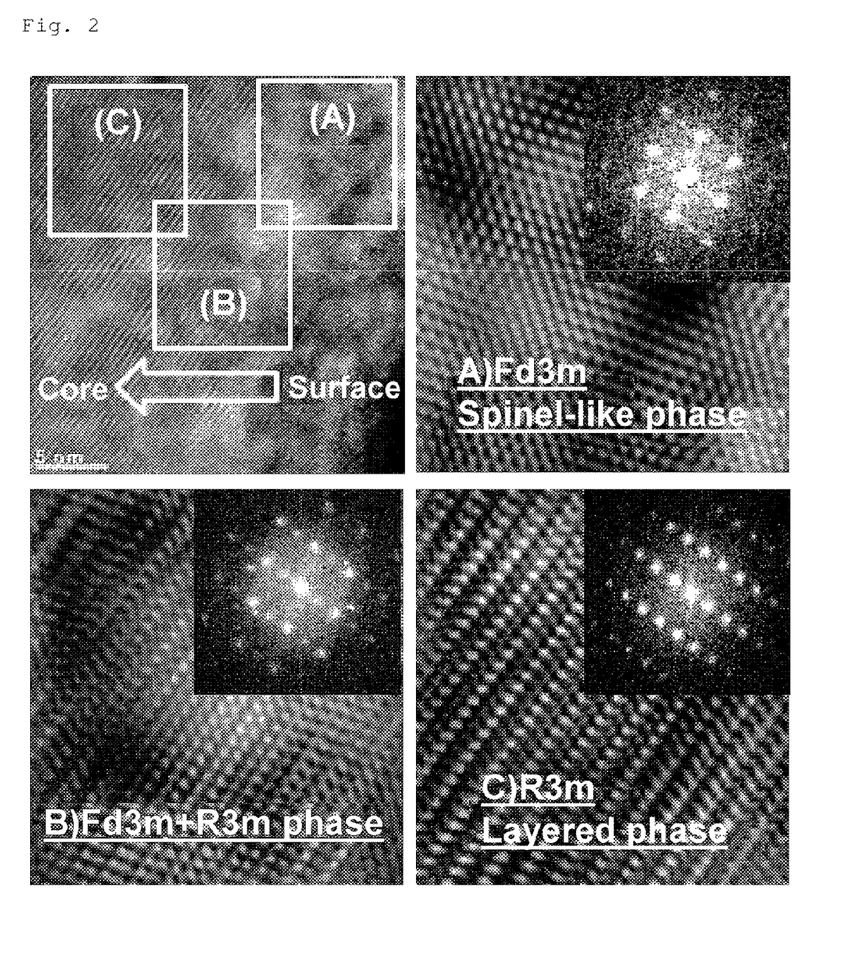
FIG. 2 illustrates photographic images for observing the crystal structure of a lithium cobalt oxide particle prepared in Preparation Example 11 using a transmission electron microscopy (TEM)

As shown in FIG. 2, the first lithium cobalt oxide present in the surface side of the lithium cobalt oxide particle was identified to have a cubic-type crystal structure of an Fd-3m space group (A) like a spinel-type crystal structure. Meanwhile, the second lithium cobalt oxide present in the active material particle was identified to have a layered crystal structure of an R_3m space group (C).

Experimental Example 4

Coin cells (using a Li metal negative electrode) were manufactured using the positive electrode active materials prepared in Preparation Example 1 and Comparative Example 1, and were charged and discharged under the conditions of room temperature (25° C.) and 0.1 C/0.1 C. Then, initial charge and discharge properties were evaluated, and the results are shown in FIG. 3.

Figure 3:
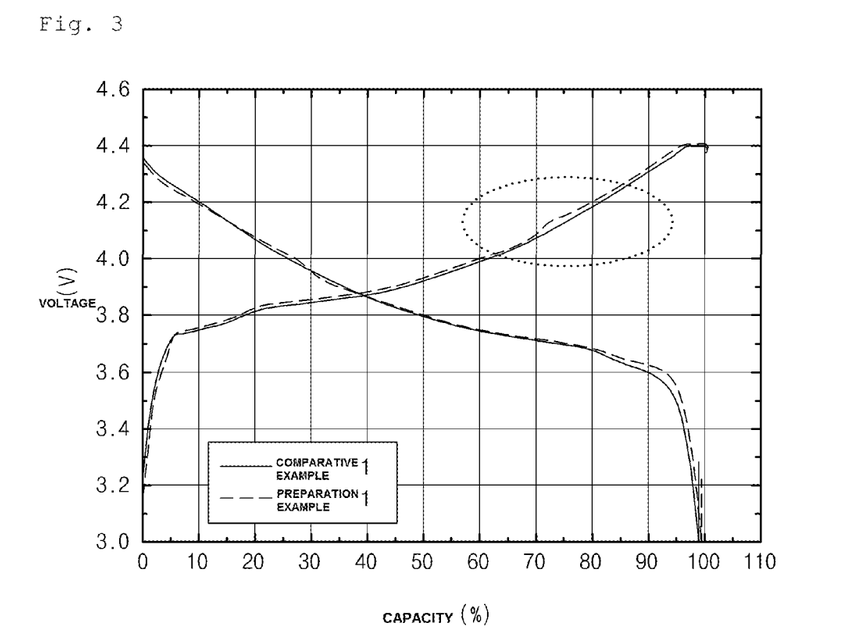
FIG. 3 is a graph illustrating initial charge and discharge properties during charging and discharging for lithium secondary batteries including positive electrode active materials prepared in Preparation Example 1 and Comparative Example 1.

From the experimental results, as shown in FIG. 3, the positive electrode active material of Preparation Example 1, having a lithium deficient structure in the lithium cobalt oxide particle illustrates almost equal degree of charge and discharge properties when compared to the positive electrode active material of $LiCoO_2$ without a lithium deficient structure according to Comparative Example 1. However, the bending of a voltage profile, that is, an inflection point was observed between 4.05 V to 4.15 V during charging and discharging due to the lithium deficient structure present in the positive electrode active material of Preparation Example 1.

Experimental Example 5

The battery properties of the lithium secondary batteries manufactured in Examples 1 to 9 including the positive electrode active materials of Preparation Examples 1 to 9, and the lithium secondary batteries prepared in Comparative Examples 1 and 2 were evaluated by the following method.

In detail, for the lithium secondary batteries manufactured in Examples 1 to 9, and Comparative Examples 1 and 2, the rate characteristic during charging and discharging was measured at room temperature (25° C.) within a driving voltage from 3 to 4.4 V under the conditions of 2 C/0.1 C, and cycle capacity retention that is the ratio of a discharge capacity at $50^{th}$ cycle with respect to an initial capacity, was measured after charging and discharging for 50 cycles at a high temperature (60° C.) within a driving voltage range from 3 to 4.4 V under the conditions of 0.5 C/1 C.

TABLE 3

|  | Rate characteristic (2 C/0.1 C, %) at room temperature (25° C.) | $50^{th}$ cycle capacity retention (%) at high temperature (60° C.) |
|---|---|---|
| Comparative Example 1 | 91.5 | 94.4 |
| Comparative Example 2 | 92.0 | 94.6 |
| Example 1 | 94.3 | 95.3 |
| Example 2 | 95.2 | 94.8 |
| Example 3 | 94.7 | 96.1 |
| Example 4 | 98.5 | 97.0 |
| Example 5 | 97.1 | 96.2 |
| Example 6 | 97.3 | 97.5 |
| Example 7 | 97.5 | 96.5 |
| Example 8 | 98.0 | 97.5 |
| Example 9 | 98.2 | 98.0 |

From the experimental results, the batteries of Examples 1 to 9 including the positive electrode active materials having a lithium deficient structure in the particle showed improved rate characteristic and cycle property at high temperatures when compared to the batteries of Comparative Examples 1 and 2 including the lithium cobalt oxides without the lithium deficient structure as the positive electrode active materials.

The invention claimed is:

1. A positive electrode active material for a lithium secondary battery, comprising:
   lithium cobalt oxide particles; and
   a surface treatment layer positioned on a surface of the lithium cobalt oxide particle,
   wherein the lithium cobalt oxide particle comprises lithium deficient lithium cobalt oxide in a surface side of the particle, the lithium deficient lithium cobalt oxide having a Li/Co molar ratio of less than 1, being included in an Fd-3m space group, and having a cubic-type crystal structure, and
   the surface treatment layer comprises at least one element selected from the group consisting of transition metals and elements in group 13,
   wherein the lithium cobalt oxide particle has a core-shell structure comprising a core part and a shell part positioned on a surface of the core part,
   wherein the shell part comprises a first lithium cobalt oxide of the following Formula 1, and the core part comprises a second lithium cobalt oxide of the following Formula 2:

$Li_{1-a}CoM_xO_2$ [Formula 1]

$Li_bCoM'_yO_2$ [Formula 2]

wherein in Formulae 1 and 2, M and M' each independently comprises at least one metal element selected from the group consisting of W, Mo, Zr, Ti, Mg, Ta, Al, Fe, V, Cr, Ba, Ca, and Nb, and "a", "b", "x", and "y" satisfy the following relations of $0<a\leq0.05$, $1\leq b\leq1.2$, $0\leq x\leq0.02$, and $0\leq y\leq0.02$.

2. The positive electrode active material for a lithium secondary battery of claim 1, wherein the surface treatment layer comprises lithium transition metal oxide having a spinel-type crystal structure.

3. The positive electrode active material for a lithium secondary battery of claim 2, wherein the lithium transition metal oxide comprises at least one selected from the group consisting of $LiCo_2O_4$, $LiMn_2O_4$, $LiNi_2O_4$, $LiNi_mMn_{2-m}O_4$ (where $0<m<2$), and $LiNi_mMn_nCo_{2-m-n}O_4$ (where $0<m<2$, $0<n<2$, and $0<m+n<2$), and a mixture thereof.

4. The positive electrode active material for a lithium secondary battery of claim 2, wherein the lithium transition metal oxide is included in an amount ratio from 0.01 to 20 wt % relative to a total amount of the positive electrode active material.

5. The positive electrode active material for a lithium secondary battery of claim 1, wherein the surface treatment layer comprises a lithium borate compound.

6. The positive electrode active material for a lithium secondary battery of claim 5, wherein the lithium borate compound comprises at least one selected from the group consisting of $LiBO_2$, $Li_2B_4O_7$, and $LiB_3O_6$, or a mixture thereof.

7. The positive electrode active material for a lithium secondary battery of claim 5, wherein the lithium borate compound is included in an amount ratio from 0.01 to 0.1 wt % relative to a total amount of the positive electrode active material.

8. The positive electrode active material for a lithium secondary battery of claim 1, wherein the surface treatment layer is formed to a thickness ratio from 0.001 to 1 relative to an average particle diameter of the lithium cobalt oxide particle.

9. The positive electrode active material for a lithium secondary battery of claim 1, wherein the lithium cobalt oxide particles comprises lithium deficient lithium cobalt oxide in a surface of the particle, and a region corresponding to a distance from 0% to less than 100% from the surface of the particle with respect to a distance (r) from the surface to the center of the particle.

10. The positive electrode active material for a lithium secondary battery of claim 1, wherein the lithium deficient lithium cobalt oxide comprises first lithium cobalt oxide of the following Formula 1:

$Li_{1-a}CoM_xO_2$ [Formula 1]

(in Formula 1, M comprises at least one metal element selected from the group consisting of W, Mo, Zr, Ti, Mg, Ta, Al, Fe, V, Cr, Ba, Ca, and Nb, and "a" and "x" satisfy the following relations of $0<a\leq0.05$, and $0\leq x\leq0.02$).

11. The positive electrode active material for a lithium secondary battery of claim 1, wherein
the first lithium cobalt oxide is included in an Fd-3m space group and has a cubic-type crystal structure, and the second lithium cobalt oxide has a layered crystal structure.

12. The positive electrode active material for a lithium secondary battery of claim 1, wherein the shell part is a region corresponding to a distance from 0% to 99% from the surface with respect to a distance from the surface to the center of the lithium cobalt oxide particle.

13. The positive electrode active material for a lithium secondary battery of claim 1, wherein the core part and the shell part has a thickness ratio from 1:0.01 to 1:0.1.

14. The positive electrode active material for a lithium secondary battery of claim 1, wherein the core part and the shell part each comprises lithium distributed with increasing concentration gradient toward the center of the lithium cobalt oxide particle.

15. The positive electrode active material for a lithium secondary battery of claim 1, wherein a lithium concentration gradient in the core part and a lithium concentration gradient in the shell part have the same or different gradient values.

16. The positive electrode active material for a lithium secondary battery of claim 1, wherein
the core part comprises the lithium with higher concentration than the shell part, and
at least one of the core part and the shell part comprises the lithium present with one concentration value in a corresponding region.

17. The positive electrode active material for a lithium secondary battery of claim 1, wherein
the lithium is distributed with a gradually increasing concentration gradient from the surface to the center of the lithium cobalt oxide particle, and
in Formulae 1 and 2, "a" is gradually decreasing toward the center of the particle within a range of $0<a\leq0.05$, and "b" is gradually increasing toward the center of the particle within a range of $1\leq b\leq1.2$.

18. The positive electrode active material for a lithium secondary battery of claim 1, having a monolith structure with an average particle diameter from 3 to 50 μm.

19. The positive electrode active material for a lithium secondary battery of claim 1, wherein an inflection point is within a voltage range from 4.0 V to 4.2 V when measuring a voltage profile according to charging and discharging.

20. A method of preparing the positive electrode active material for a lithium secondary battery according to claim 1, the method comprising:
preparing second lithium cobalt oxide particles by mixing a cobalt raw material and a lithium raw material in amounts satisfying the relation of $1\leq Li/Co$ molar ratio, and first heating;
preparing lithium cobalt oxide particles comprising lithium deficient first lithium cobalt oxide in a surface side of the particle by mixing a cobalt raw material and a lithium raw material in amounts satisfying the relation of $0<Li/Co$ molar ratio$<1$ with respect to the second lithium cobalt oxide particles, and second heating; and
forming a surface treatment layer comprising a lithium compound comprising at least one selected from the group consisting of transition metals and elements in group 13, or a mixture thereof, on a surface of the lithium cobalt oxide particle,
wherein the lithium deficient first lithium cobalt oxide has a Li/Co molar ratio of less than 1, is included in an Fd-3m space group, and has a cubic-type crystal structure.

21. The method of preparing the positive electrode active material for a lithium secondary battery of claim 20, further comprising an adding process of a raw material comprising at least one metal element selected from the group consisting of W, Mo, Zr, Ti, Mg, Ta, Al, Fe, V, Cr, Ba, Ca, and Nb during mixing the cobalt raw material and the lithium raw material in the preparing of the second lithium cobalt oxide particles.

22. The method of preparing the positive electrode active material for a lithium secondary battery of claim 20, wherein the preparing of the second lithium cobalt oxide particles is conducted by mixing the cobalt raw material and the lithium raw material in amounts satisfying the relation of $1\leq Li/Co$ molar ratio$\leq1.2$, and heating at from 800° C. to 1,100° C.

23. The method of preparing the positive electrode active material for a lithium secondary battery of claim 20, wherein the second heating is conducted by heating at from 800° C. to 1,100° C.

24. The method of preparing the positive electrode active material for a lithium secondary battery of claim 20, further comprising an adding process of a raw material comprising at least one metal element selected from the group consisting of W, Mo, Zr, Ti, Mg, Ta, Al, Fe, V, Cr, and Nb during mixing the cobalt raw material and the lithium raw material with respect to the second lithium cobalt oxide.

25. The method of preparing the positive electrode active material for a lithium secondary battery of claim 20, wherein the forming of the surface treatment layer is conducted by mixing the lithium cobalt oxide particles with a lithium compound or a precursor thereof comprising at least one element selected from the group consisting of transition metals and elements in group 13, and heating at from 650° C. to 800° C.

26. A positive electrode for a lithium secondary battery, the positive electrode comprising the positive electrode active material according to claim 1.

27. A lithium secondary battery comprising the positive electrode according to claim 26.

28. A positive electrode active material for a lithium secondary battery, comprising:
  lithium cobalt oxide particles; and
  a surface treatment layer positioned on a surface of the lithium cobalt oxide particle,
  wherein the lithium cobalt oxide particle comprises lithium deficient lithium cobalt oxide in a surface side of the particle, the lithium deficient lithium cobalt oxide having a Li/Co molar ratio of less than 1, being included in an Fd-3m space group, and having a cubic-type crystal structure, and
  the surface treatment layer comprises lithium transition metal oxide having a spinel-type crystal structure, and wherein the lithium transition metal oxide comprises at least one selected from the group consisting of $LiCo_2O_4$, $LiMn_2O_4$, $LiNi_2O_4$, $LiNi_mMn_{2-m}O_4$ (where $0<m<2$), and $LiNi_mMn_nCo_{2-m-n}O_4$ (where $0<m<2$, $0<n<2$, and $0<m+n<2$), and a mixture thereof.

* * * * *